United States Patent [19]

Sommargren

[11] Patent Number: 4,594,003

[45] Date of Patent: Jun. 10, 1986

[54] INTERFEROMETRIC WAVEFRONT MEASUREMENT

[75] Inventor: Gary E. Sommargren, Madison, Conn.

[73] Assignee: Zygo Corporation, Middlefield, Conn.

[21] Appl. No.: 515,393

[22] Filed: Jul. 20, 1983

[51] Int. Cl.$^4$ ............................................. G01B 9/02
[52] U.S. Cl. ................................... 356/349; 356/359
[58] Field of Search .................... 356/349, 359, 360

[56] References Cited

U.S. PATENT DOCUMENTS

| | | |
|---|---|---|
| 3,507,596 | 4/1970 | Bliek et al. ........................... 356/349 |
| 3,694,088 | 9/1972 | Gallagher et al. |
| 4,159,522 | 6/1979 | Zanoni. |
| 4,169,980 | 10/1979 | Zanoni. |
| 4,201,473 | 5/1980 | Domenicali et al. |
| 4,225,240 | 9/1980 | Balasubramanian. |
| 4,325,637 | 4/1982 | Moore. |
| 4,417,813 | 11/1983 | Bartholomew ....................... 356/349 |

OTHER PUBLICATIONS

Jones et al., "An Automated Interferogram Analysis Technique" *Applied Optics*, vol. 7, pp. 1477–1482, 8/68.
Bruning et al., "Digital Wavefront Measuring Interferometer for Testing Optical Surfaces and Lenses", *Applied Optics* vol. 13, pp. 2693–2703, 11/74.
Moore et al., "Direct Measurement of Phase in a Spherical-Wave Fizeau Interferometer", Applied Optics, vol. 19, pp. 2196–2200, 7/80.
Schaham, "Precision Optical Wavefront Measurement", *Prog. SPIE*, vol. 306, pp. 183–191, 1981.
Zanoni, "Interferometry", *Optical Industry and Systems Purchasing Directory*, pp. E80–E82, 1983.
Hu, "Polarization Heterodyne Interferometry Using a Simple Rotating Analyzer 1: Theory and Error Analysis", *Applied Optics*, vol. 22, pp. 2052–2056, 7/83.
Spectra—Physics Model 550 DIAD System (Digital Interferometric Analysis and Display), brochure, 1979.
Coherent, "Introducing . . . The Tropel 70/E", brochure.
Massie et al., "High—Performance Real—Time Heterodyne Interferometry", *Applied Optics*, vol. 18, pp. 1797–1803, 6/79.

*Primary Examiner*—Davis L. Willis
*Assistant Examiner*—Matthew W. Koren
*Attorney, Agent, or Firm*—Stiefel, Gross, Kurland & Pavane

[57] ABSTRACT

Apparatus is disclosed for the phase measurement of an interference pattern produced by an unequal path interferometer. The invention comprises in one embodiment the use of a diode laser light source whose wavelength is varied so that the phase difference between the two wavefronts producing the interference pattern is modulated by a known amount. The modulated interference pattern is photosensed with an imaging device, and the signals processed to provide a phase map representing the optical path difference between the reference and measurement wavefronts of the interferometer.

19 Claims, 5 Drawing Figures

INTERFEROMETRIC WAVEFRONT MEASUREMENT

BACKGROUND OF THE INVENTION

1. Field of the Invention

The present invention relates to a method and apparatus for interferometrically measuring wavefronts commonly encountered in optical metrology. More particularly, the invention relates to apparatus for use in conjunction with either plano or spherical unequal path interferometers for the purpose of rapidly and accurately measuring the distortion of either surfaces or transmitted wavefronts. No physical contact with the article under test is required.

2. The Prior Art

The use of interferometry to measure optical components and systems has grown significantly due to technological advances in lasers, photosensors, and microcomputers. At the same time relatively low-cost instruments have become more widely available for automatic data analysis and quantitative evaluation of interference patterns; see, for example, C. Zanoni, "Interferometry," *The Optical Industry and Systems Purchasing Directory*, Book 2, pp. E-80–E-82 (1983).

Two different approaches are used to perform wavefront measurements. In the first approach, fringe pattern interferometry (FPI), the optical path difference between the two wavefronts of the interferometer is calculated from the positions of the fringe centers in either a photographed or a real time interference pattern; see, for example, R. A. Jones and P. L. Kadakia, "An Automated Interferogram Technique," *Applied Optics*, vol. 7, pp. 1477–1482 (1968); Zanoni, U.S. Pat. No. 4,159,522 issued June 26, 1979, and Zanoni, U.S. Pat. No. 4,169,980 issued Oct. 2, 1979.

In the second approach, phase measuring interferometry (PMI), the optical path difference between the two wavefronts of the interferometer is measured at each resolution element of the detector while phase modulating the interference pattern; see, for example, J. H. Bruning, et al., "Digital Wavefront Measuring Interferometer for Testing Optical Surfaces and Lenses," *Applied Optics*, vol. 13, pp. 2693–2703 (1974); Gallagher, et al., U.S. Pat. No. 3,694,088 issued Sept. 26, 1972; N. Balasubramanian, U.S. Pat. No. 4,225,240 issued Sept. 30, 1980; M. Schaham, *Proceedings SPIE*, vol. 306, pp. 183–191 (1981); and H. Z. Hu, "Polarization heterodyne interferometry using a simple rotating analyzer. 1: Theory and error analysis," *Applied Optics*, vol., 22, pp. 2052–2056 (1983).

Fringe pattern interferometry, however, is sensitive to geometrical distortions and provides low data density (direct sampling is only on the fringe centers) thereby limiting overall system accuracy. Furthermore, because of the difficulty involved in automatically following complex fringe patterns with FPI, its use is limited to patterns with relatively simple geometry.

Thusly, fringe pattern interferometry provides an adequate technique for wavefront measurements where: (1) the fringe pattern is simple, (2) low-to-modest data density is adequate; (3) the test aperture is very large (i.e., other than simply concave); and (4) the fringe pattern is recorded photographically.

Phase measuring interferometry is capable of providing high data density and is insensitive not only to the intensity profile of the beam but also to the geometrical distortion in the optics or detector to first order. This makes phase measuring interferometry potentially more accurate than fringe pattern interferometry. It also enables the measurement of wavefronts of any fringe geometry and complexity as longe as the maximum fringe density does not exceed one fringe/two resolution elements (pixels) of the detector.

In prior art phase measuring techniques, the optical path difference, or phase, between the two wavefronts of the interferometer is altered, or modulated, by a known amount by one of the following means: (1) mechanically moving an optical element of the interferometer with a piezoelectric transducer, (2) rotating a phase retardation plate in the interferometer, (3) use of either an acousto-optic, electro-optic, or similar device in the interferometer, and (4) variation of the incident angle, see for example, Moore, U.S. Pat. No. 4,325,637 issued Apr. 20, 1982. Most of the prior-art phase modulators require the use of refractive optics in the measurement leg of the interferometer for either large aperture or fast spherical measurements. The refractive optics are not only a serious source of error but also quite expensive. The mechanical motion of an optical element of the interferometer cavity in the prior-art methods must be an extremely precise, tilt-free translation in a straight line. Furthermore, when an optical element with a non-plano surface must be moved to achieve the phase modulation, elaborate corrections must be made in the data analysis, see for example R. C. Moore, "Direct measurement of phase in a spherical-wave Fizeau interferometer," *Applied Optics*, vol. 19, pp. 2196–2200 (1980). Variation of the incident angle is useful for low precision, plano measurements. Specifically, all of the prior art modulation techniques are expensive and introduce significant measurement errors when large aperture plano or fast spherical wavefront measurements are required.

While prior-art modulation techniques are useful for some applications, it is desirable to do phase measuring interferometry with a modulation technique which is not subject to the problems inherent in the prior-art modulation techniques.

OBJECT OF THE INVENTION

In view of the foregoing, it is the main object of this invention to provide an improved apparatus and method for phase measuring interferometry which greatly reduces the inherent measurement errors produced by the phase modulator.

Another object of the invention is to provide an apparatus and method which obviates the need for refractive optics in the interferometer cavity.

Another object of the invention is to provide an apparatus and method which obviates the need for any precise linear motion of the optical elements of the interferometer cavity.

Another object of the invention is to provide such an apparatus and method which accommodates the measurement of large aperture wavefronts.

Another object of the invention is to provide such an apparatus and method which places no restrictions on the shape of the reference surface.

Another object of the invention is to provide such an apparatus and method which produces the same phase modulation over the entire measurement aperture.

Another object of the invention is to provide such an apparatus and method which greatly increases the linearity of the phase modulation.

Another object of the invention is to provide such an apparatus and method with all of the aforementioned improvements at substantially less cost than prior-art techniques.

STATEMENT OF THE INVENTION

In accordance with the instant invention, I provide an optical interferometer system capable of measuring a full range of test articles comprising: (1) a source of a beam of coherent, single wavelength energy, most preferably a diode laser; (2) means for varying the wavelength of said source monotonically over the time required for photosensing the interference pattern produced by (3) means, most preferably an unequal path interferometer system, for converting said beam into an interference pattern produced between a reference wavefront and a measurement wavefront; (4) means for determining the magnitude of the wavelength variation of said source to provide phase modulation for said interference pattern; (5) means, preferably a two-dimensional, solid state array camera, for photosensing the radiant energy of said interference pattern over an array of points over a time period of at least one full cycle of said phase modulation; (6) means for converting said photosensed radiant energy in said interference pattern into a phase map representing the optical path difference between said reference and measurement wavefronts. The means (2) for varying the wavelength of the diode laser is preferably an alternating current of very low magnitude, generally a small fraction of a percent of the direct current used to drive the diode laser; it alternately shortens and lengthens the optical length of the laser's cavity due to the small temperature changes that it produces.

THE DRAWINGS

In the drawings,

FIG. 1 depicts in schematic form an embodiment of the instant invention with a Fizeau interferometer cavity.

FIG. 2(a) depicts in schematic form an embodiment of the preferred phase modulator of the instant invention. FIG. 2(b) shows the waveform for a dynamic phase measurement method. FIG. 2(c) shows the waveform for a static phase measurement method.

FIG. 3 depicts a schematic block diagram of the circuitry used in one embodiment of the invention.

DETAILED DESCRIPTION OF THE INVENTION

Figure 1:
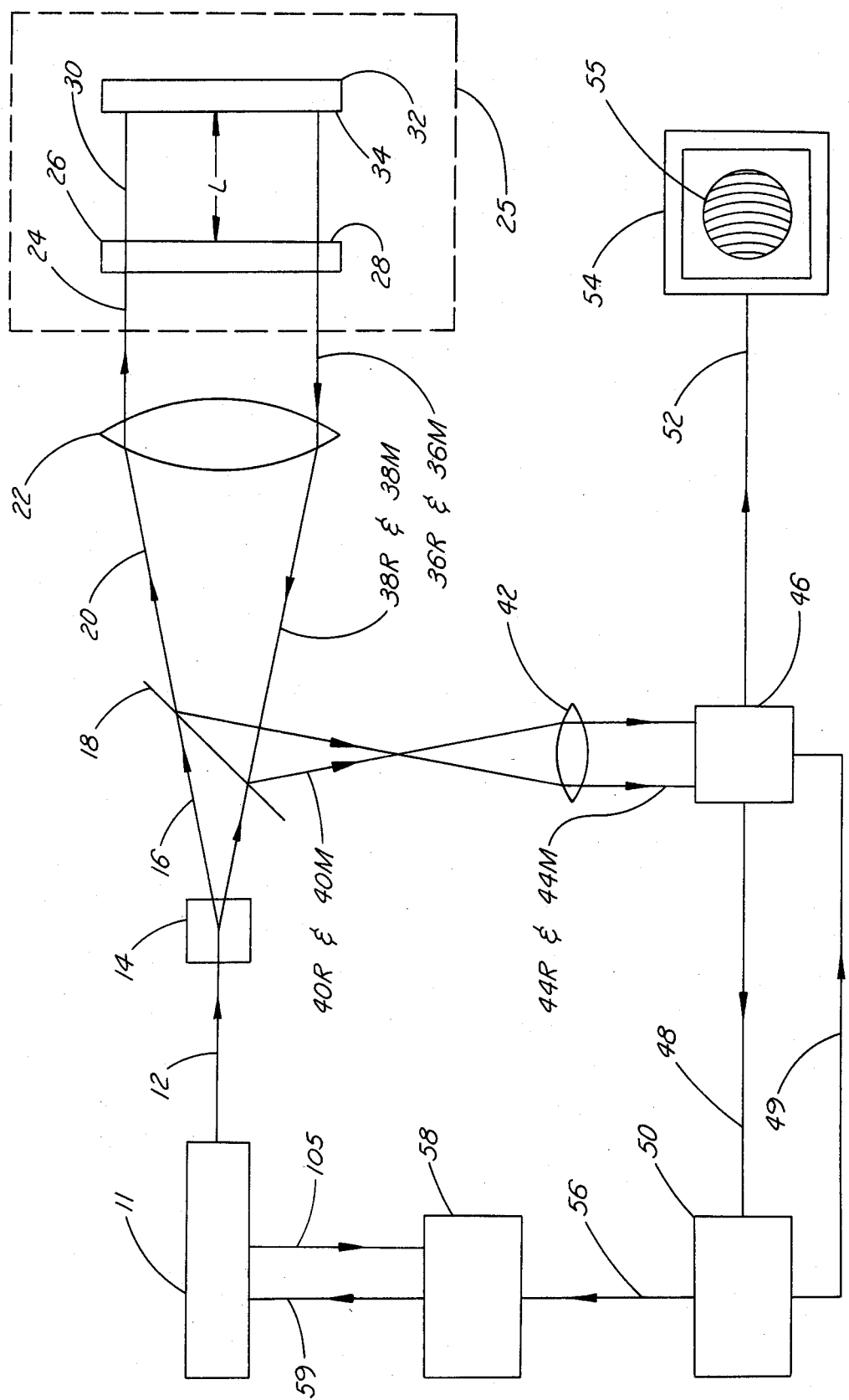

FIG. 1 depicts in schematic form an embodiment of the instant invention with a Fizeau interferometer cavity. It is applicable, however, to all unequal path interferometer types, e.g. plano- and spherical-type Fizeau, Twyman-Green and holographic configurations. While the apparatus has application for a wide range of radiation sources, the following description is taken by way of example with respect to an optical measuring system. The term "radiant energy" as used herein includes, but is not limited to, electromagnetic energy of all frequency ranges. A light source (11), most preferably a diode laser module, provides coherent optical energy of single wavelength for the narrow nearly collimated beam (12). The spatial filter-beam diverger (14) converts laser beam (12) into a diverging spherical wavefront (16). The spatial filter-beam diverger (14), as is well known, uses an internal lens system and a small aperture located at the focus of the lens system to eliminate spurious beams and artifacts which are frequently found to accompany the principal output beam of a laser. Part of the diverging spherical wavefront (16) is transmitted by the partially reflective-partially transmissive beamsplitter (18) to produce the diverging wavefront (20) which collimating lens (22) converts to a plano wavefront (24). The plano wavefront (24) encounters the Fizeau-type interferometer (25). More specifically, the plano wavefront (24) impinges on the partially reflective transmission element (26) which has a partially reflective, flat reference surface (28). The wavefront (36R) is the portion of wavefront (24) which is reflected by the reference surface (28). Wavefront (36R), hereafter denoted the reference wavefront, is collected by lens (22) to form the converging spherical reference wavefront (38R). The portion (30) of wavefront (24) which is transmitted by the reference surface (28) is denoted the measurement wavefront. If surface (34) of element (32) is the article under test, then the portion of wavefront (30) reflected by surface (34) and transmitted by element (26) is the plano wavefront (36M) which is denoted the measurement wavefront after interaction with the article under test. This too is collected by lens (22) to form the converging spherical wavefront (38M). Portions of wavefronts (38R) and (38M) are reflected by beamsplitter (18) to produce spherical wavefronts (40R) and (40M) which are collimated by lens (42) to form plano wavefronts (44R) and (44M). The interference of wavefronts (44R) and (44M) forms an interference pattern on the photosensitive elements, pixels, of an imaging device (46), which can be a solid state camera with either a CCD, CID, MOS or photodiode array. Imaging device (46) may be a linear array with either the interference pattern or the array scanned in a direction orthogonal to the length of the array for some applications. The standard RS170 video output (52) of imaging device (46) is fed into a CCTV monitor (54). When the elements (26) and (32) of the interferometer are properly aligned, an image (55) of the interference pattern appears on the monitor (54). The details for aligning an interferometer are disclosed in Domenicalli and Hunter, U.S. Pat. No. 4,201,473 issued May 6, 1980. Output (48) provides the photosignals from the array of pixels of imaging device (46) to the electronic processor (50). Electronic signals (49) are provided by the processor (50) to control the camera (46) if needed. The electronic output (56) from processor (50) is fed into the current driver (58) which provides the proper time varying signal (59) to vary the wavelength of the source (11) by varying the optical length of the laser cavity. In a gas laser, for example, this is achieved by either moving one mirror (in external mirror types) or by stretching the tube (in internal mirror types). Preferably, however, with a diode laser, wavelength variation is achieved by varying the drive current which in turn changes the temperature of the laser and hence its optical length. It can be shown that the wavelength of a laser is given by $$\lambda = \lambda_0 (1 + \alpha l / l_0) \tag{1}$$

where $\lambda_0$ is the wavelength for a laser cavity of nominal optical length $l_0$, $\Delta l$ is the variation in the laser cavity's optical length, and $\Delta l << l_0$. If this is substituted into the equation for the intensity $I(x,y)$ of the interference pattern from a two beam interferometer, $$I(x,y) = c_0 + c_1 \cos\left(\frac{2\pi z}{\lambda} - \phi(x,y)\right),\tag{2}$$

where $c_0$ and $c_1$ are constants, z is the on-axis optical path through the interferometer (z=2L where L is the distance between the mirrors, i.e., the length of the interferometer cavity, see FIG. 1) and $\phi(x,y)$ is the phase associated with the article under test, then Eq. 2 becomes $$I(x,y) = c_0 + c_1 \cos\left(\frac{4\pi L}{\lambda_0} - \frac{4\pi L \Delta l}{\lambda_0 l_0} - \phi(x,y)\right).\tag{3}$$

The overall phase $\Omega$ is then, $$\Omega(x,y) = \frac{4\pi L}{\lambda_0} - \frac{4\pi L \Delta l}{\lambda_0 l_0} - \phi(x,y).\tag{4}$$

The first term is a constant over the entire aperture and can be ignored. The second term gives rise to the phase modulation. To determine $\phi(x,y)$, data is taken while the phase modulation term varies by $2\pi$ (visually, this moves the entire fringe pattern by one fringe). The required variation, $\Delta l$, in the laser cavity's optical length to produce the $2\pi$ phase variation is therefore given by $$\frac{4\pi L \Delta l}{\lambda_0 l_0} = 2\pi \tag{5}$$

or $$\Delta l = \frac{\lambda_0}{2}\left(\frac{l_0}{L}\right).\tag{6}$$

Thusly, $\Delta l$ depends on the length of the interferometer cavity, L. For longer interferometer cavities, smaller variations in the laser cavity's optical length are needed, and vice versa.

To keep the laser from mode hopping as the laser cavity's optical length changes, the following constraint is put on $\Delta l$:

$$\Delta l < l_0/2. \tag{7}$$

Combining Eqs. (6) and (7) gives $$L > l_0. \tag{8}$$

This requires that the interferometer cavity be longer than the laser cavity. For a gas laser, this constraint requires the interferometer cavity to be inordinately long. However, for a diode laser it has no practical impact since the laser cavity's optical length is a fraction of a millimeter.

Figure 2:
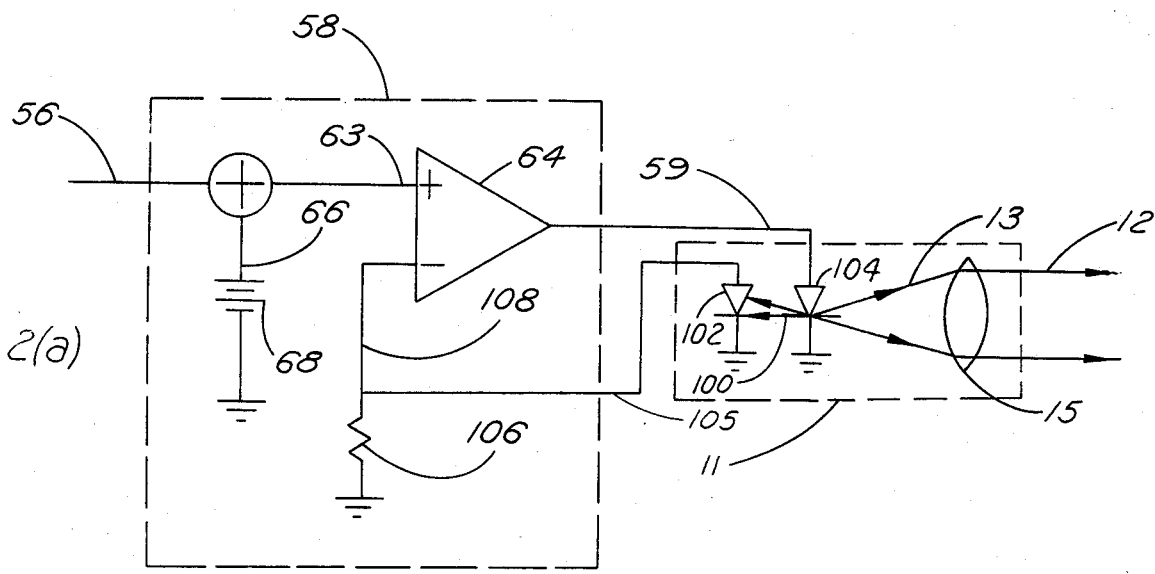
Figure 2:
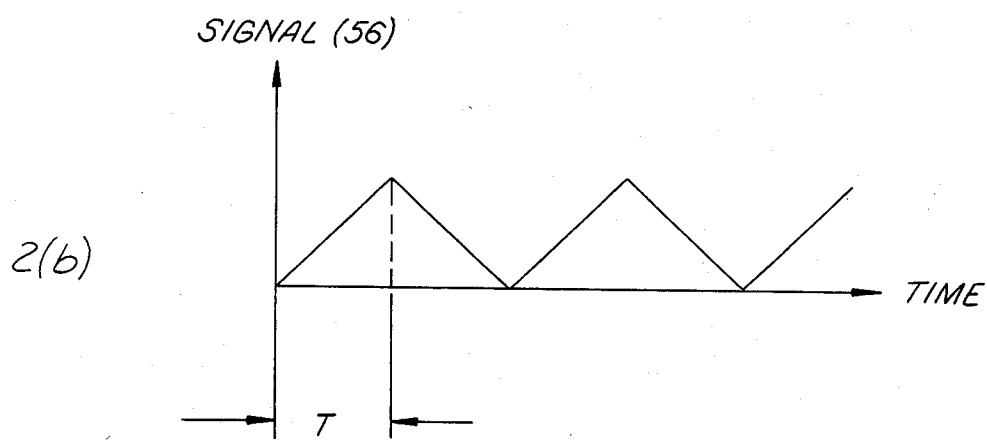
Figure 2:
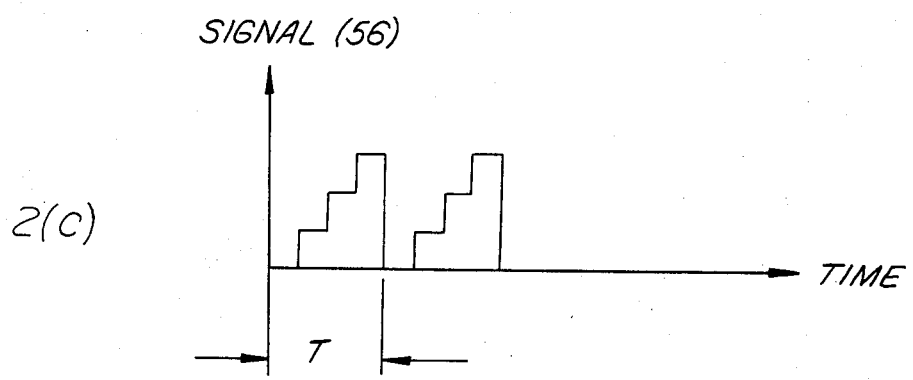

Signal (105) from the light source (11) is used to stabilize the quiescent wavelength as detailed in the description of FIG. 2(a).

FIG. 2(a) depicts in schematic form an embodiment of the preferred phase modulator of the instant invention. The current driver (58), larger dashed box, is used to modulate the wavelength of diode laser (104) and thus produce the phase modulation in the interference pattern in the following way: The reference voltage (63) is the sum of a DC component (66) and an AC waveform (56). The amplitude of the AC waveform (56) is a small percentage of the DC component (66), i.e., less than 1%. The DC component (66) is provided by a battery (68) or other DC source and produces a nominal wavelength $\lambda_0$ from the diode laser (104). The amplitude of the AC waveform (56) is automatically adjusted by the processor (50) using Eq. (6) to produce the wavelength variation in the diode laser (104) necessary to obtain a $2\pi$ phase modulation in the interference pattern. A feedback loop, comprised of an operational amplifier (64), a photodetector (102), and a resistor (106), is used to keep constant the quiescent wavelength of the diode laser (104). Photodetector (102), which is built into the diode laser module (11), smaller dashed box, measures the output power of the diode laser (104) using the diverging wavefront (100) emerging from the diode laser's second face to provide a signal (105) which generates a feedback signal (108) for the operational amplifier (64). The output of the diode laser (104) is a wavelength modulated, diverging wavefront (13) which is collimated by lens system (15) to produce the narrow beam (12).

FIGS. 2(b) and 2(c) show the waveforms of the modulation signal (56) for dynamic and static phase measurement methods, respectively.

Figure 3:
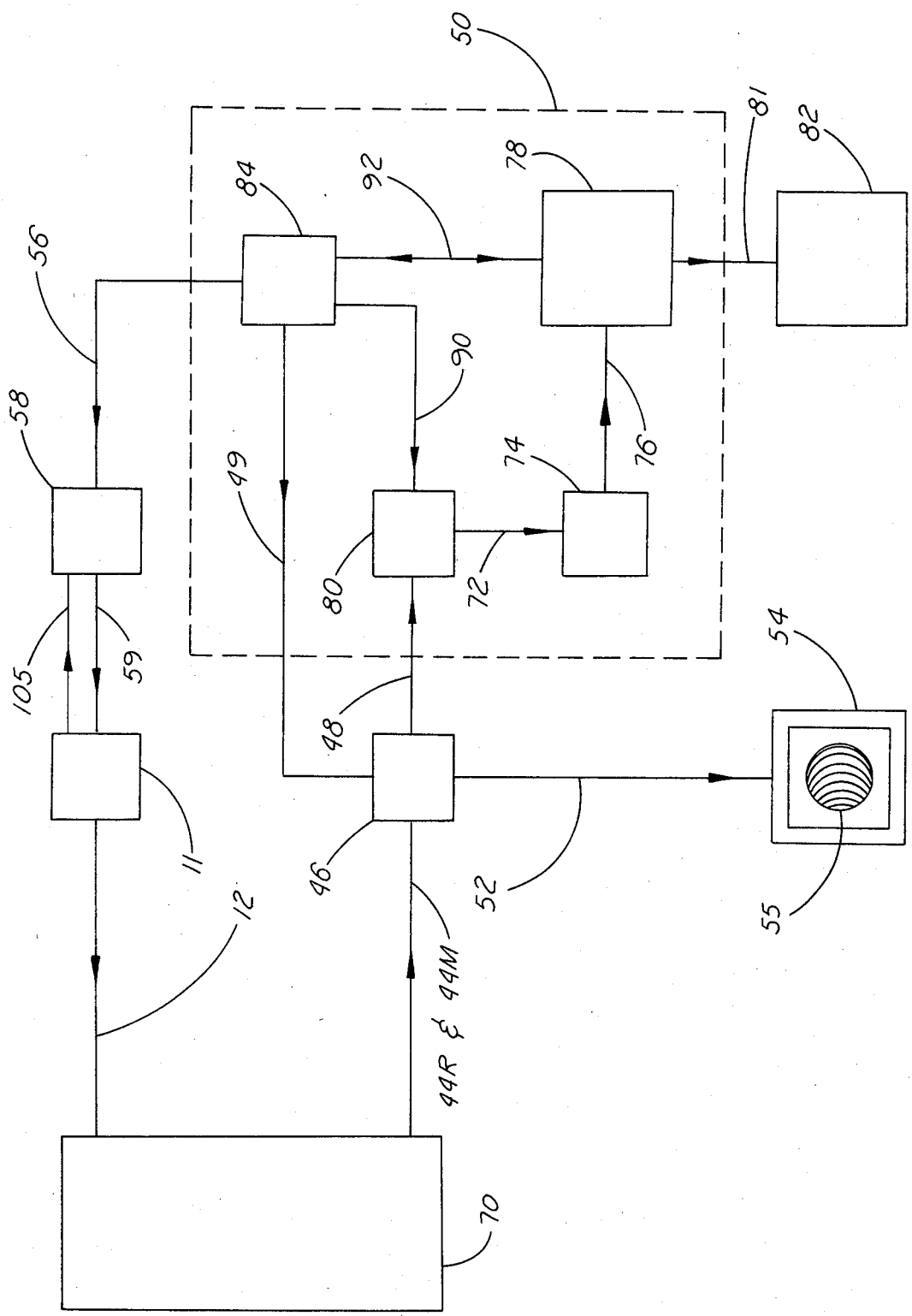

FIG. 3 depicts a schematic block diagram of the circuitry used in one embodiment of the invention.

In FIG. 3, the interference of wavefronts (44R) and (44M) produced by interferometer (70) forms an interference pattern on the photosensitive elements of the imaging device (46). The output (52) of imaging device (46) is fed into a CCTV monitor (54) to view an image (55) of the interference pattern. Output (48) of imaging device (46) is fed into the analog-to-digital (A/D) converter (80) to provide the digital signal (72) which is stored in memory (74). The microprocessor (78) not only manipulates the data stored in memory (74), received via digital signal (76), but also provides and receives signals (92) with the measurement control unit (84) and provides an output signal (81) to the output device (82) which may be a printer, for example. The measurement control unit (84) provides (1) a waveform signal (56) to the current driver (58); (2) a clock signal (49) to the imaging device (46); and (3) a synchronization signal (90) to the A/D converter (80). The output (59) of current driver (58) is applied to the diode laser module (11) which produces a narrow, nearly collimated beam (12) of coherent optical energy of single wavelength which is the light used in interferometer (70).

A phase map of the interference pattern can be produced with the method described by M. Schaham, op. cit. However, the present invention is not limited to this method and can be used with a variety of phase map methods, e.g. see Gallagher, op. cit. In order to implement the latter method, the waveform (56) from the processor (50) takes the form shown in FIG. 2(c).

By scanning the imaging device (46) N times during a modulation period T, see FIG. 2(b), each pixel integrates the intensity of the interference pattern it samples during the time interval T/N to produce integrals B(0), B(1), ..., D(N−1). Equation (2) can be rewritten as $$I(x,y) = I_0\{1 + C \sin[\omega t + \phi(x,y)]\} \tag{9}$$

where $I_0$ is a constant, C is the fringe visibility, $\omega$ is the modulation frequency [$\omega = (2\pi/T)$], and $\phi(x,y)$ is the phase associated with the article under test. Equation (9) contains four unknowns; namely $I_0$, C, $\omega$, and $\phi(x,y)$. Therefore, at least four measurements must be taken at each pixel to obtain the phase $\phi(x,y)$. The integrals at each pixel are:

$$B(0) = I_0 \int_{-T/2N}^{T/2N} \{1 + C \sin(\omega t + \phi(x,y))\} dt \quad (10)$$

$$= I_0 \left( \frac{T}{N} + \frac{2C}{\omega} \sin\phi(x,y) \sin\omega T/2N \right) \quad (11)$$

$$B(k) = I_0 \int_{(2k-1)\frac{T}{2N}}^{(2k+1)\frac{T}{2N}} \{1 + C \sin(\omega t + \phi(x,y))\} dt \quad (12)$$

$$= I_0 \left\{ \frac{T}{N} + \frac{2C}{\omega} \sin\left(\frac{\omega Tk}{N} + \phi(x,y)\right) \sin\frac{\omega T}{2N} \right\} \quad (13)$$

When N=4, $$B(0) = I_0 T \left( \frac{1}{4} + \frac{\sqrt{2}}{2\pi} C \sin\phi(x,y) \right) \quad (14)$$

$$B(1) = I_0 T \left( \frac{1}{4} + \frac{\sqrt{2}}{2\pi} C \cos\phi(x,y) \right) \quad (15)$$

$$B(2) = I_0 T \left( \frac{1}{4} - \frac{\sqrt{2}}{2\pi} C \sin\phi(x,y) \right) \quad (16)$$

$$B(3) = I_0 T \left( \frac{1}{4} - \frac{\sqrt{2}}{2\pi} C \cos\phi(x,y) \right) \quad (17)$$

The phase at each pixel, $\phi(x,y)$, is obtained using the relation $$\phi(x,y) = \arctan\left( \frac{B(0) - B(2)}{B(1) - B(3)} \right) \quad (18)$$

The principal advantages of the instant invention are: (1) improved simplicity and accuracy, (2) the absence of refractive elements in the interferometer cavity, (3) the absence of precise, tilt free linear motion, (4) lower cost, (5) the ability to measure large aperture wavefronts, and (6) the ability to use various shapes for the reference surface.

For some applications it is desirable to reduce or destroy the coherence length of the radiant energy. The instant invention can readily be so modified without departing from the scope of the invention using a suitable device, such as a rotating ground glass, suitably placed in the interferometer. For example, the coherence length of the radiant energy can be reduced or destroyed either before it enters the interferometer cavity, e.g., see Moore, U.S. Pat. No. 4,325,637 issued Apr. 20, 1982, or after the reference and measurement wavefronts are combined to form an interference pattern, e.g. see Domenicalli and Hunter, U.S. Pat. No. 4,201,473 issued May 6, 1980.

While a preferred embodiment of the invention has been disclosed, obviously modification can be made therein, without departing from the scope of the invention as defined in the following claims.

What is claimed is:

1. An interferometer system comprising a source of a beam of coherent signal wavelength energy, comprising a laser; an unequal path optical interferometer means disposed for converting said beam into an interference pattern produced between a reference wavefront and a measurement wavefront; means for varying the wavelength of said source monotonically to provide phase modulation of said interference pattern; means for determining magnitude of the wavelength variation of said source required to provide at least one full cycle of said phase modulation of said interference pattern; and means for photosensing the radiant energy of said interference pattern over an array of points over a time period of at least one full cycle of said phase modulation, said wavelength varying means monotonically varying said wavelength over the time required for said photosensing of said interference pattern.

2. The system of claim 1, in which said photosensing means is a two-dimensional, solid state array camera.

3. The system of claim 1 further comprising means for converting said photosensed radiant energy in said interference pattern into a phase map representing the optical path difference between said reference and measurement wavefronts.

4. The system of claim 3 in which said laser comprises a diode laser.

5. The system of claim 4 in which said photosensing means is a two-dimensional, solid state array camera.

6. The system of claim 4, in which said means for varying the wavelength of said diode laser is an AC current which is combined with a DC current to drive said diode laser and is a very small fraction of said DC current, the alternating changes in temperature caused by said AC current serving to vary the optical length of the cavity of said diode laser.

7. The system of claim 1 in which said laser comprises a diode laser.

8. The system of claim 7 in which said means for varying the wavelength of said diode laser is an AC current which is combined with a DC current to drive said diode laser and is a very small fraction of said DC current, the alternating changes in temperature caused by said AC current serving to vary the optical length of the cavity of said diode laser.

9. The system of claim 7 in which said photosensing means is a two-dimensional, solid state array camera.

10. The system of claim 7 in which said unequal path interferometer means comprises a plano type interferometer.

11. The system of claim 7 in which said unequal path interferometer means comprises a spherical type interferometer.

12. The system of claim 7 further comprising means optically associated with said unequal path optical interferometer means for reducing or destroying the coherence length of said coherent single wavelength energy.

13. The system of claim 12 and wherein said coherence length reducing or destroying means comprises a rotating ground glass.

14. The system of claim 1 in which said unequal path interferometer means comprises a plano type interferometer.

15. The system of claim 1 in which said unequal path interferometer means comprises a spherical type interferometer.

16. The system of claim 1 in which said unequal path interferometer means comprises a Fizeau type interferometer.

17. The system of claim 1 in which said unequal path interferometer means comprises a Twyman-Green type interferometer.

18. The system of claim 1 further comprising means optically associated with said unequal path optical interferometer for reducing or destroying the coherence length of said coherent single wavelength energy.

19. The system of claim 18 wherein said coherence length reducing or destroying means comprises a rotating ground glass.

* * * * *

UNITED STATES PATENT AND TRADEMARK OFFICE
CERTIFICATE OF CORRECTION

PATENT NO. : 4,594,003

DATED : June 10, 1986

INVENTOR(S) : Gary E. Sommargren

It is certified that error appears in the above-identified patent and that said Letters Patent is hereby corrected as shown below:

Column 2, line 4: "longe" should read --long--.

Column 8, line 5: "signal" should read --single--.

Signed and Sealed this

Seventh Day of April, 1987

Attest:

DONALD J. QUIGG

*Attesting Officer*  *Commissioner of Patents and Trademarks*